United States Patent
Kataoka (10) Patent No.: US 12,553,574 B2
(45) Date of Patent: Feb. 17, 2026

(54) HYDROGEN CHARGING EQUIPMENT

(71) Applicant: TOYOTA JIDOSHA KABUSHIKI KAISHA, Toyota (JP)

(72) Inventor: Chiaki Kataoka, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/892,726

(22) Filed: Sep. 23, 2024

(65) Prior Publication Data

US 2025/0137589 A1 May 1, 2025

(30) Foreign Application Priority Data

Oct. 31, 2023 (JP) ................. 2023-186468

(51) Int. Cl.
*F17C 5/00* (2006.01)

(52) U.S. Cl.
CPC ........ *F17C 5/00* (2013.01); *F17C 2201/0109* (2013.01); *F17C 2203/0604* (2013.01); *F17C 2205/0138* (2013.01); *F17C 2205/0352* (2013.01); *F17C 2221/012* (2013.01); *F17C 2265/06* (2013.01)

(58) Field of Classification Search
CPC .................. F17C 5/00; F17C 2221/012; F17C 2201/0133; F17C 2201/0128
See application file for complete search history.

(56) References Cited

U.S. PATENT DOCUMENTS

| | | | | |
|---|---|---|---|---|
| 5,143,608 | A * | 9/1992 | Marshall, Sr. | ..... B01D 17/0217 210/171 |
| 8,357,214 | B2 * | 1/2013 | Patton | ..................... C01B 3/065 422/630 |
| 8,991,445 | B2 * | 3/2015 | Nakazawa | ........ H01M 8/04208 141/2 |

FOREIGN PATENT DOCUMENTS

| | | | |
|---|---|---|---|
| DE | 102014013372 A1 * | 3/2016 | ........ H01M 8/04164 |
| JP | 2016-157522 A | 9/2016 | |

* cited by examiner

*Primary Examiner* — Timothy L Maust
(74) *Attorney, Agent, or Firm* — Dinsmore & Shohl LLP (57) ABSTRACT

A hydrogen filling device capable of suppressing mixing of water when filling a hydrogen tank with hydrogen. A hydrogen supply unit, a trap tank through which hydrogen supplied from the hydrogen supply unit, a main pipe which is a pipe extending from the trap tank, and a hydrogen supply branch pipe which is a pipe extending from the main pipe to the hydrogen tank, the trap tank includes a container portion, an inlet for flowing hydrogen into the container portion from the hydrogen supply unit, provided vertically above the inlet, and an outlet for flowing out the hydrogen from the container portion to the main pipe.

1 Claim, 6 Drawing Sheets

HYDROGEN CHARGING EQUIPMENT

CROSS-REFERENCE TO RELATED APPLICATIONS

This application is based upon and claims the benefit of priority of the prior Japanese Patent Application No. 2023-186468, filed on Oct. 31, 2023, the entire contents of which are incorporated herein by reference.

FIELD

The present disclosure relates to an apparatus for filling hydrogen into a hydrogen tank.

BACKGROUND

Patent Document 1 discloses that, in a hydrogen storage unit, a plurality of hydrogen tanks are mounted on a manifold, hydrogen is filled in a plurality of tanks via a manifold, and hydrogen is supplied from a plurality of tanks via a manifold.

CITATION LIST

Patent Literature

Patent Literature 1: JP 2016-157522 A

SUMMARY

Technical Problem

When filling hydrogen from the hydrogen supply device to a plurality of tanks, water adhering to the receptacle is a connection port between the hydrogen supply device side and the hydrogen filling device may flow into the tank together with the hydrogen. Water accumulated in the hydrogen tank, it is difficult to provide a discharge port due to the structure of the tank, it is difficult to drain. Even if a small amount of water is mixed in a single hydrogen filling, if the amount of water is increased by repeated filling, there is a concern that a problem such as water flowing into an apparatus using hydrogen in a tank may occur.

In view of the above, it is an object of the present disclosure to provide a hydrogen filling apparatus capable of suppressing mixing of water when hydrogen is filled in a hydrogen tank.

Solution to Problem

The present application discloses a hydrogen filling apparatus for filling hydrogen into a plurality of hydrogen tanks, a hydrogen supply unit, a trap tank through which hydrogen supplied from the hydrogen supply unit, a main pipe which is a pipe extending from the trap tank, and a hydrogen supply branch pipe which is a pipe extending from the main pipe to the hydrogen tank, wherein the trap tank includes a container portion, an inlet for allowing hydrogen to flow into the container portion from the hydrogen supply unit, provided direction above the inlet, and an outlet for allowing hydrogen to flow out from the container portion to the main pipe, and a hydrogen filling apparatus.

The container portion may be provided with a flow path extending spirally from the inlet toward the outlet.

A porous wall may be provided on an outer periphery of the spiral extending channel.

Effects

According to the hydrogen filling apparatus of the present disclosure, water mixed into hydrogen is excluded by the trap tank before hydrogen is supplied to the hydrogen tank, so that inflow of water into the hydrogen tank can be suppressed.

DESCRIPTION OF EMBODIMENTS

1. Hydrogen Tank

It will be described first hydrogen cartridge is one form example of a hydrogen tank in which hydrogen is filled by the hydrogen filling apparatus of the present disclosure.

Figure 1A:
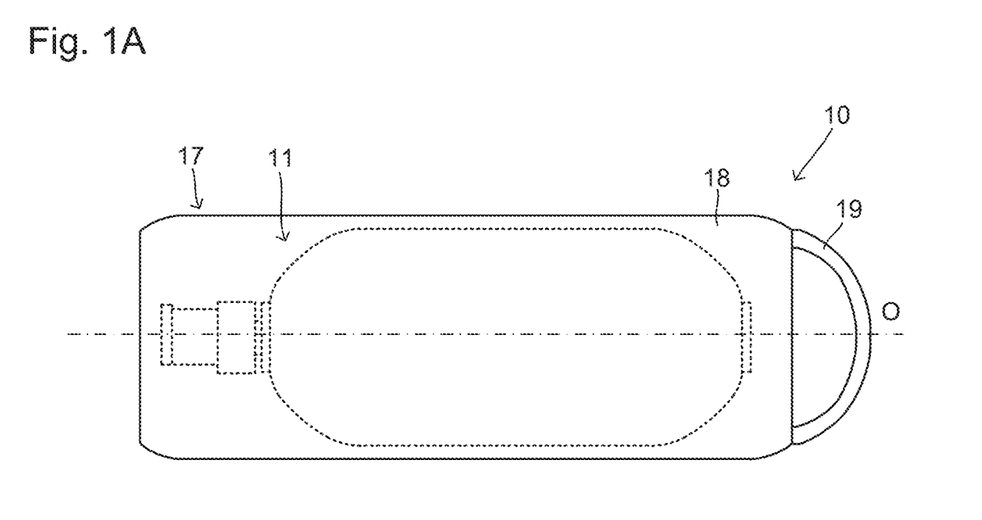
FIG. 1A is a diagram illustrating an external view of a hydrogen cartridge 10.
Figure 1B:
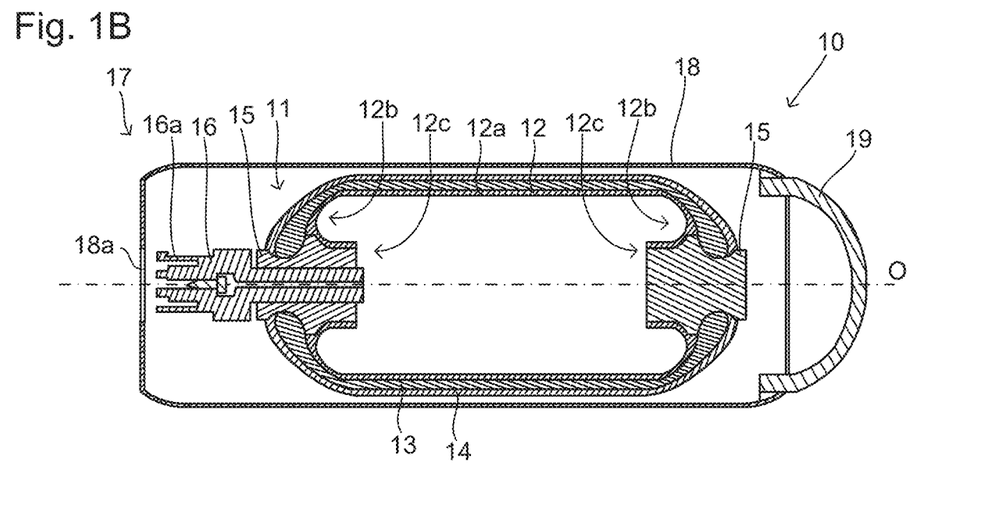
FIG. 1B is a diagram illustrating a cross-sectional view of the hydrogen cartridge 10.

The hydrogen cartridge 10 is a container for storing hydrogen in a liquid state or a gaseous state. FIGS. 1A and 1B show diagrams for illustration. FIG. 1A is an external view of the hydrogen cartridge 10 (the tank body 11 to be contained is represented by a dotted line). FIG. 1B is a cross-sectional view along the direction of the axis O of the hydrogen cartridge 10. As can be seen from these figures, the hydrogen cartridge 10 in this form has a tank body 11 and a case 17.

Further, the tank body 11 includes a liner 12 constituting a container body, a reinforcing layer 13, and a protective layer 14, and a mouthpiece 15 and an opening/closing valve 16 are disposed in the container body and the mouthpiece 15.

1.1. Liner

The liner 12 is one of the members constituting the container body of the tank body 11, and is a hollow member defining an internal space, and is cylindrical in this form. Liner 12, the opening at both ends of the fuselage portion 12a whose diameter is substantially constant is narrowed by the dome-shaped side-end 12b, the mouthpiece 15 is disposed in the narrowed opening 12c.

It is sufficient that the liner 12 is made of a material capable of holding hydrogen contained in its internal space without leaking, and a known material can be used. Specifically, for example, a nylon resin, a polyethylene-based synthetic resin, or made of a metal such as stainless steel or aluminum. In some embodiments, the material constituting the liner is a synthetic resin from the viewpoint of weight reduction.

The thickness of the liner 12 is not particularly limited, but in some embodiments is 0.5 mm-3.0 mm.

1.2. Reinforcement Layer

The reinforcing layer 13 is one of members constituting the container body, and a fiber is laminated over a plurality of layers, and a cured resin is impregnated into the fiber. A layer made of fibers is formed by winding a fiber bundle over a plurality of layers to a predetermined thickness on an outer periphery of a liner 12. Although the thickness of the reinforcing layer 13 and the number of turns of the fiber bundle are determined by the required strength, they are not particularly limited, but are of a 10 mm-30 mm degree.

[Fiber Bundles]

For example, carbon fibers are used for the fiber bundle of the reinforcing layer 13, and the fiber bundle has a band shape in which carbon fibers form a bundle and have a predetermined cross-sectional shape (e.g., a rectangular cross section). Although not particularly limited, there may be mentioned a rectangular shape having a 6 mm-20 mm cross section and a 0.1 mm-0.3 mm thickness. The amount of carbon fibers contained in the fiber bundle is not particularly limited, and examples thereof include a carbon fiber of about 36000.

[Impregnated Resin]

The resin impregnated and cured in the fiber (fiber bundle) in the reinforcing layer 13 is not particularly limited as long as it can increase the strength of the fiber by this. Examples thereof include a thermosetting resin which is cured by heat, and specific examples thereof include an amine-based or anhydride-based curing accelerator and an epoxy resin containing a rubber-based reinforcing agent, an unsaturated polyester resin, and the like. In addition, a resin composition containing an epoxy resin as a main agent and cured by mixing a curing agent thereto can be also mentioned. According to this, it is automatically cured by allowing the resin composition which is the mixture to reach and penetrate the fiber layer between the time when the main agent and the curing agent are mixed and cured.

1.3. Protective Layer

If necessary, a protective layer 14 may be disposed on the outer periphery of the reinforcing layer 13 as one of the members constituting the container body. When provided, for example, glass fibers are wound and impregnated with a resin. The resin to be impregnated can be considered similarly to the reinforcing layer 13. Thus it is possible to impart impact resistance to the tank body 11.

The thickness of the protective layer 14 is not particularly limited, but may be about 1.0 mm-1.5 mm.

1.4. Mouthpiece

Mouthpiece 15 is a member which is attached to each of the two opening 12c of the liner 12 is disposed at each of the axial line O of the liner 12, the mouthpiece 15 on one end side of the container body opening and closing valve 16 is disposed with functions as an opening for communicating the inside and outside. The other end side mouthpiece 15 is closed. The member constituting the base 15 is not particularly limited as long as it has the necessary strength, and examples thereof include stainless steel and aluminum.

1.5. Open/Close Valve

The on-off valve 16 is closed when the hydrogen cartridge 10 is not mounted in the hydrogen filling apparatus 20, is opened by being pressed by the push rod of the connecting device 25 when the hydrogen cartridge 10 is mounted in the hydrogen filling apparatus 20 (not shown).

The distal end of the on-off valve 16, on the side connected to the hydrogen filling device 20 has a connecting portion 16a connected to the hydrogen filling apparatus 20. The connecting portion 16a is a portion capable of engaging and disengaging the connecting portion 16a and the connecting device 25 of the hydrogen-filling device 20. The specific aspect is not limited, but a mechanical coupling (mechanical interface) can be exemplified in the present embodiment, among which a mount such as connecting a photographing lens to the main body in the camera can be applied, and more specifically, it is possible to use the C mount. Therefore, in this form, the connecting portion 16a is connected to the connecting device 55 of the hydrogen charging device 20 while rotating the hydrogen cartridge 10 about the axial line O.

1.6. Case

Case 17 is a member that contains the tank body 11 to form the outer shell of the hydrogen cartridge 10, and has a housing 18 and a handle 19.

Housing 18 is a cylindrical member, and is configured to be able to store the tank body 11 inside thereof. In the housing 18 is provided with a hole 18a at a position where the opening and closing valve 16 of the stored tank main body 11 is opposed, it is configured to be able to access the opening and closing valve 16 from the outside.

The handle 19 is an arch-shaped member disposed at an end of the housing 18 opposite to the side on which the opening/closing valve 16 of the tank main body 11 is disposed. The user can carry the hydrogen cartridge 10 with the handle 19 or perform the operation of attaching/detaching the hydrogen cartridge 10 to/from the hydrogen filling device 20.

1.7. Other

The allowable pressure of the tank body 11 is not particularly limited, but a tank in which hydrogen can be stored at an allowable pressure of 70 MPa or less beyond 20 MPa may be exemplified from the viewpoint of being relatively easy to carry and capable of storing more hydrogen.

2. Structure of the Hydrogen Filling Device

Next, a structure of a hydrogen filling apparatus according to one example. Although an embodiment in which hydrogen is filled in the hydrogen cartridge described above will be described here, the hydrogen tank which is an object to be filled with hydrogen is not limited to the hydrogen cartridge described above, and may be a hydrogen tank of another known form.

Figure 2:
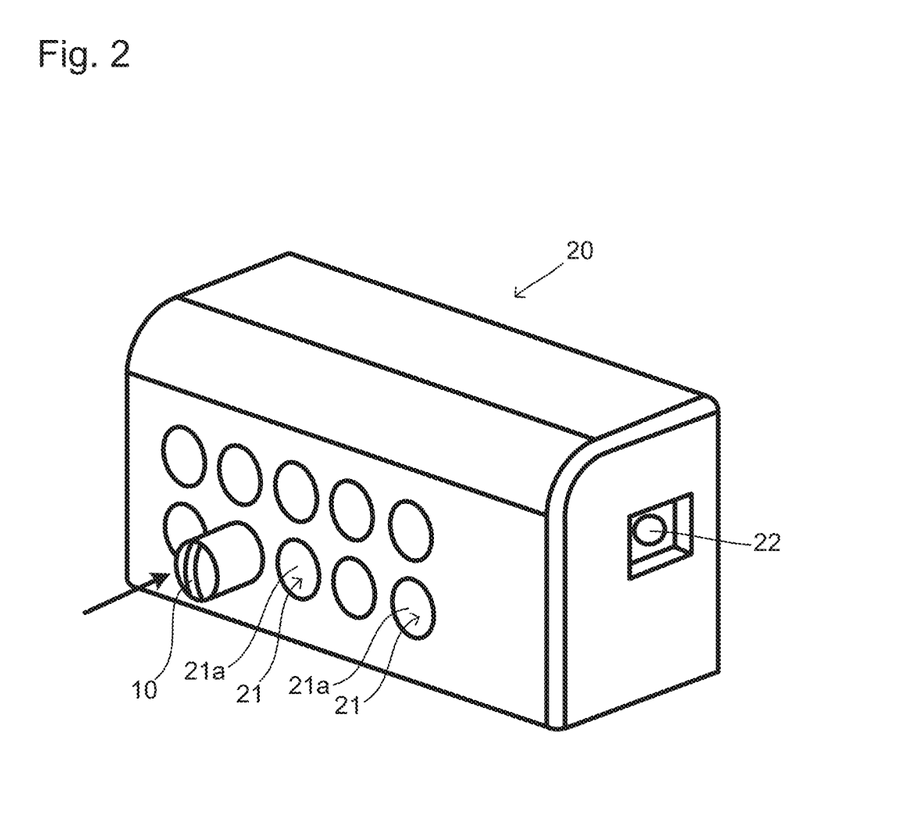
FIG. 2 is an appearance of the hydrogen filling device 20.
Figure 3:
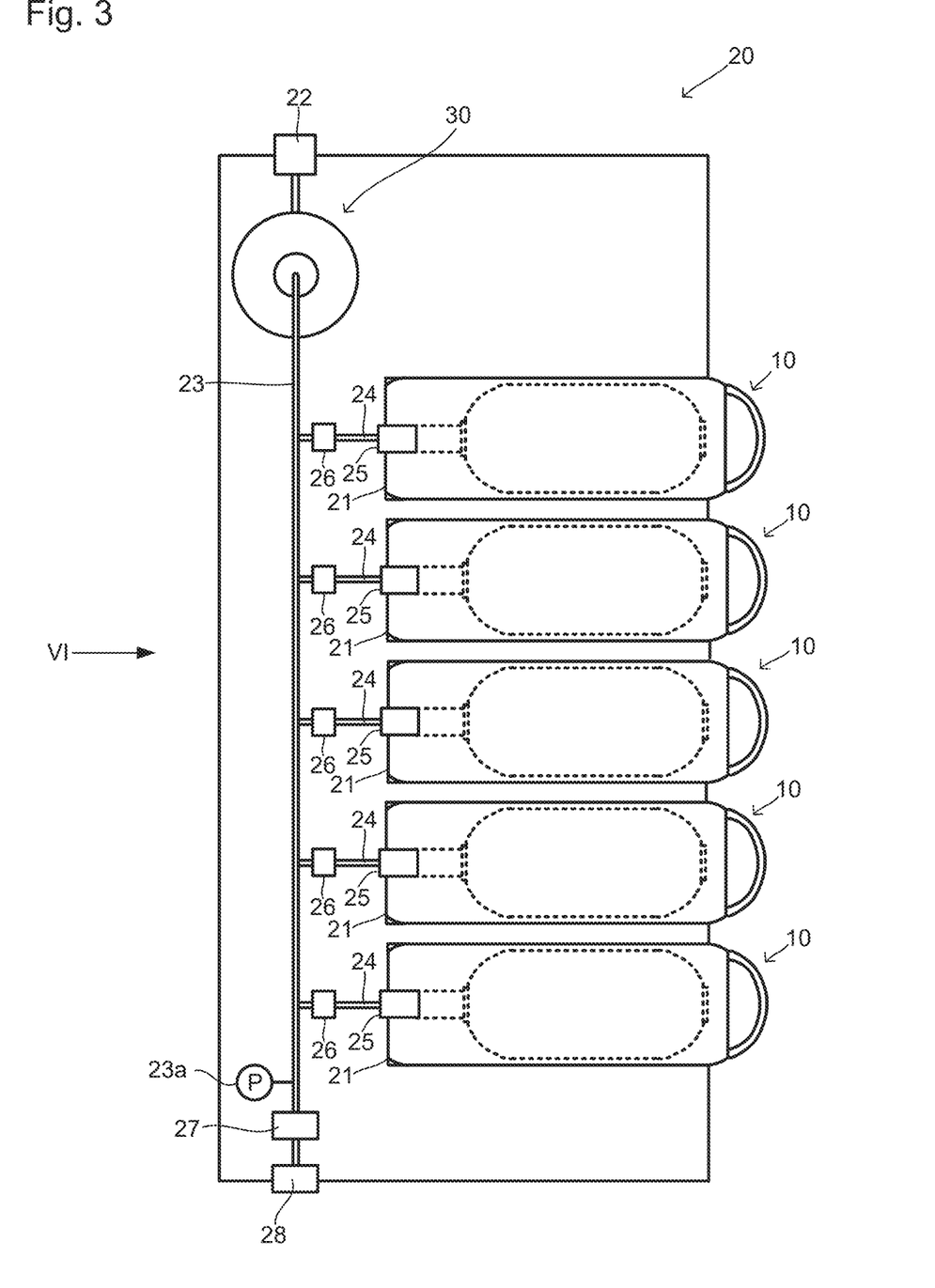
FIG. 3 is a diagram illustrating an internal configuration of the hydrogen filling apparatus 20.
Figure 4:
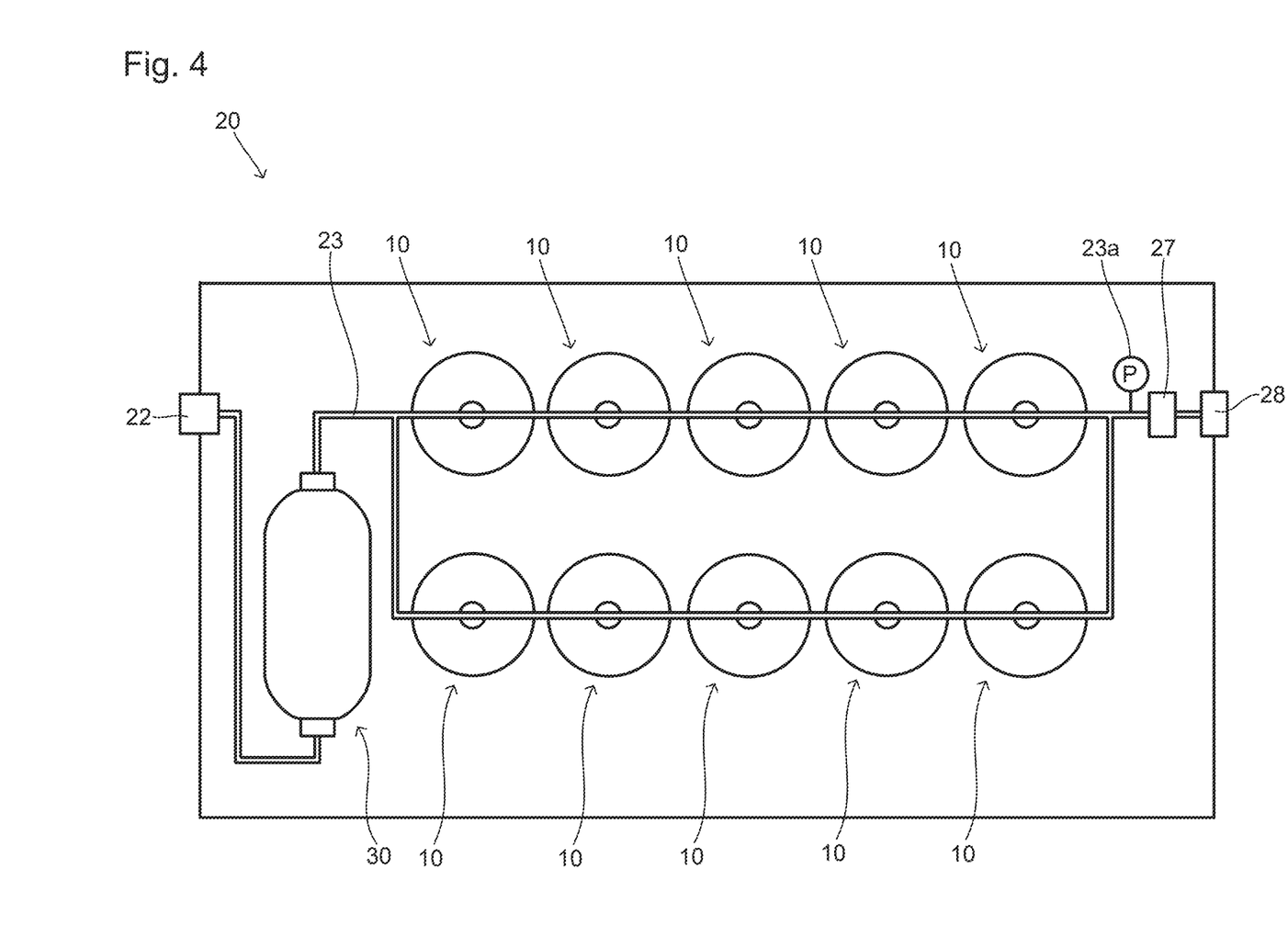
FIG. 4 is a diagram illustrating the internal configuration of the hydrogen filling device 20 from a different viewpoint from FIG. 3.

FIG. 2 is an external perspective view of the hydrogen filling device 20 according to one embodiment. FIG. 3 is a view showing the internal configuration of the hydrogen filling apparatus 20, the upper two stages of the housing portion 21 of the upper and lower two stages in FIG. 2 when viewed hydrogen filling apparatus 20 from above a view schematically represented by perspective. FIG. 4 is a view of the hydrogen filling apparatus 20 from the direction indicated by the arrow VI in FIG. 3, the hydrogen filling apparatus 20 is a view schematically showing the internal structure as viewed from the rear side.

The hydrogen filling device 20 is a device for filling hydrogen into the hydrogen cartridge 10. In other words, it is configured such that the hydrogen cartridge 10 in which hydrogen is consumed is mounted and can be detached after the hydrogen cartridge 10 is filled with hydrogen.

Therefore, the hydrogen filling apparatus 20 includes a housing portion 21, the hydrogen supply unit 22, the main pipe 23, the hydrogen supply branch pipe 24, the connecting device 25, the solenoid valve 26, the valve 27, the hydrogen discharge unit 28, and the trap tank 30.

It will be described in more detail below for.

[Storage Part]

The storage portion 21 is a portion where the hydrogen cartridge 10 is stored when the hydrogen cartridge 10 is connected to the hydrogen filling device 20. FIG. 2 schematically shows a situation in which the hydrogen cartridge 10 is to be stored in one storage portion 21. FIG. 4 shows a scene in which the hydrogen cartridge 10 is mounted on all of the plurality of arranged housing portion 21.

As can be seen from these figures, the storage portion 21 is a space in which the hydrogen cartridge 10 is disposed, and is a space surrounded by an inner wall having an opening 21a in which the hydrogen cartridge 10 can be taken in and out. Connecting device 25 is disposed at the bottom of the housing portion 21 opposite to the opening 21a.

In this form, the storage portion 21 is provided with 5 storage portions 21 at each stage in the upper and lower 2 stages, but the number of the storage portions 21 is not particularly limited.

[Hydrogen Supply Section]

The hydrogen supply unit 22 is a supply port for supplying hydrogen to be filled in the hydrogen cartridge 10 to the hydrogen filling device 20. Thus the hydrogen supply unit 22 connecting member of the hydrogen supply pipe extending from the hydrogen supply device such as a hydrogen station (sometimes referred to as a nozzle.) is connected. A receptacle may be cited as a typical form of hydrogen supply 22.

[Main Piping]

The main pipe 23 is a pipe through which hydrogen connecting from the hydrogen supply unit 22 to the hydrogen discharge unit 28 flows, the hydrogen supply branch pipe 24 is branched from the main pipe 23.

Incidentally, the main pipe 23 trap tank 30 is provided in the middle thereof. The trap tank 30 will be described in detail later.

Further, the main pipe 23 is provided with a pressure gauge 23a, it may be configured to be able to know the internal pressure.

[Hydrogen Supply Branch Pipe and Connecting Device]

Hydrogen supply branch pipe 24 branches from the main pipe 23, a pipe extending toward each housing portion 21. Hydrogen supply branch pipe 24 is a pipe through which hydrogen to be filled in the hydrogen cartridge 10, and supplies hydrogen to the connecting device 25.

Connecting device 25, at the bottom of the housing portion 21, is disposed at a connection portion between the tank body 11 of the hydrogen cartridge 10 of the hydrogen supply branch pipe 24, connected to the opening and closing valve 16 of the tank body 11 described above, the opening and closing of the opening and closing valve 16 of the tank body 11 operation to flow hydrogen into the tank body 11.

Connecting device 25 in this form has a rod-shaped push rod disposed in the housing portion 21 (not shown), the hydrogen from the hydrogen supply branch pipe 24 while the push rod presses the valve body of the on-off valve 16 when the hydrogen cartridge 10 is housed in the housing portion 21 is opened the on-off valve 16 hydrogen can flow into the tank body 11.

Further, the connecting device 25 in this form has a connected portion engaged with the connecting portion 16a provided at the distal end of the on-off valve 16 (not shown). The form of the part to be connected is a form adapted to the form of the connecting portion 16a.

[Solenoid Valve]

Solenoid valve 26 is an on-off valve provided in each hydrogen supply branch pipe 24, it is possible to solenoid control. In this form, the solenoid valve 26 is electrically connected to a control device such as a computer (not shown), the open and close state is controlled based on a signal from the control device.

In the present embodiment, it has been decided to switch the opening and closing of the hydrogen supply branch pipe 24 by providing the solenoid valve 26, not limited to this, the push rod provided in the connecting device 25 is configured to be electrically controlled open and close control, it may also serve as a solenoid valve.

[Valve and Hydrogen Discharge Section]

Valve 27 is a switching valve provided in the main pipe 23, it is possible to discharge the hydrogen to the outside from the hydrogen discharge unit 28 by opening the valve 27. On the other hand, when the valve 27 is closed, the discharge of hydrogen from the hydrogen discharge portion 28 to the outside is regulated.

The valve 27 may be a valve that can be opened and closed manually, or may be a valve that opens and closes by an electrical signal. When configured to open and close by an electrical signal is electrically connected to the control device, the open and close state may be controlled by the control device.

[Trap Tank]

The trap tank 30 is a tank arranged in series with respect to the main pipe 23, the hydrogen supply unit 22, the hydrogen supply branch pipe 24 closest to the hydrogen supply unit 22 (considering the direction in which hydrogen flows when hydrogen is filled, the hydrogen supply unit 22 upstream side, the hydrogen discharge unit 28 and the most upstream side when the downstream side). It is disposed between. In other words, when hydrogen is filled into the hydrogen cartridge 10, hydrogen supplied from the hydrogen supply unit 22 passes through the trap tank 30 and is distributed to each hydrogen cartridge 10 (hydrogen supply branch pipe 24).

At this time, as can be seen from FIG. 4, the hydrogen supplied from the hydrogen supply unit 22 enters the trap tank 30 from the vertical direction downward of the trap tank 30, exits the trap tank 30 from the vertical direction upward, and is distributed to each hydrogen cartridge 10. Thus, water mixed into hydrogen is separated in the trap tank 30, and mixing of the water into the hydrogen cartridge 10 is suppressed.

Hereinafter, a configuration of the trap tank 30 will be specifically described.

<First Form>

Figure 5:
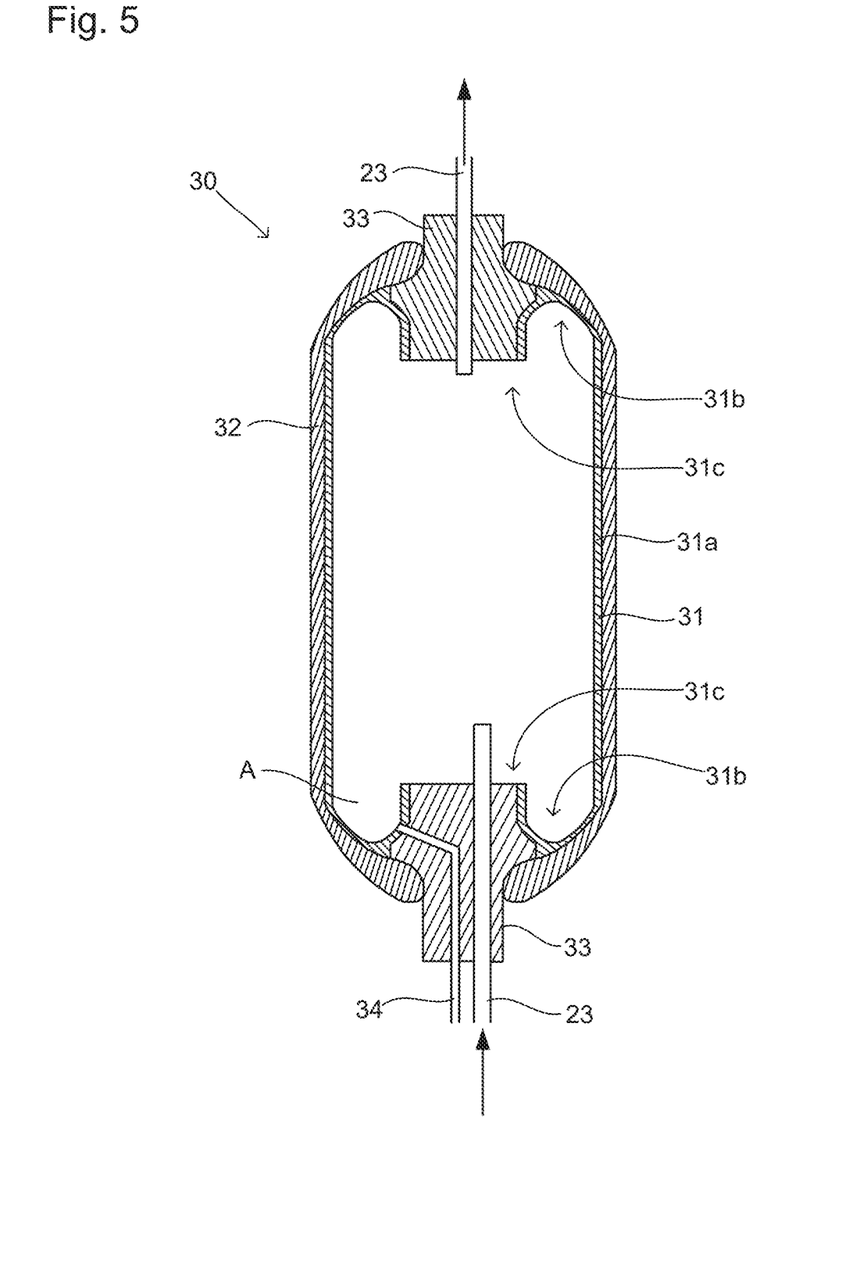
FIG. 5 is a diagram illustrating the structure of the trap tank 30.

FIG. 5 shows a cross-sectional view of the trap tank 30. As can be seen from FIG. 5, the trap tank 30 comprises an inner layer 31 constituting the container portion, an outer layer 32, a base 33 in the container portion, and a drain pipe 34 is disposed in one of the base 33.

The inner layer 31 is one of members constituting the container portion of the trap tank 30, and is a hollow member that partitions an inner space as a container. Specific shapes and materials may be considered similar to the liner 12 of the hydrogen cartridge 10 described above. The inner layer 31 is thus also provided with a body 31a, a side-end 31b and an opening 31c.

The outer layer 32 is one of members constituting the container portion, and a fiber is laminated over a plurality of layers, and a cured resin is impregnated into the fiber. A layer made of fibers is formed by winding a fiber bundle on an outer periphery of an inner layer 31 over a plurality of layers up to a predetermined thickness. The thickness of the outer layer 32 and the number of turns of the fiber bundle are not particularly limited because they are determined by the required strength, but are of a 10 mm-30 mm degree.

Specific configurations of the fiber bundle and the impregnation resin can be considered in the same manner as the reinforcing layer 13 of the hydrogen cartridge 10 described above.

The mouthpiece 33 is a member attached to each of the two openings 31c of the inner layer 31, and is disposed at each of both axial ends of the inner layer 31, and both of the mouthpieces 33 function as an opening for communicating the inside and outside of the container portion (inner layer 31). Specifically, the main pipe 23 is disposed so as to penetrate the mouthpiece 33 hydrogen is filled in the container portion is discharged from the container portion.

Here, in the trap tank 30, one of the mouthpieces 33 is disposed vertically upward (above the plane of the paper) to constitute an outlet of hydrogen, and the other mouthpiece 33 is disposed vertically downward (below the plane of the paper) to constitute an inlet of hydrogen. A drain 34 is passed through the lower base and communicates with the lower portion of the container.

The member constituting the base 33 is not particularly limited as long as it has the necessary strength, and examples thereof include stainless steel and aluminum.

According to the hydrogen filling apparatus 20 including the trap tank 30 of the present embodiment, hydrogen is filled in the hydrogen cartridge 10 as follows.

In the hydrogen charging device 20 in the initial state, the solenoid valve 26 (or solenoid push rod), and the valve 27 is in the closed position. When the control device receives a signal indicating that the hydrogen cartridge 10 is mounted on the hydrogen filling device 20 from this condition and the nozzle of the hydrogen supply device is connected to the hydrogen supply unit 22 from this state, or when the control device receives a signal of the start of the hydrogen filling after the mounting, the control device opens the electromagnetic valve 26 (or the electromagnetic push rod).

Thus, hydrogen flows from the hydrogen supply unit 22, the main pipe 23, the trap tank 30, the main pipe 23, and hydrogen flows in the order of the hydrogen supply branch pipe 24 hydrogen is filled in the hydrogen cartridge 10.

Here, the water adhering to the hydrogen supply device side and the hydrogen supply unit 22 may flow into the main pipe 23 together with the hydrogen, the water is gravity inside the container portion of the trap tank 30 (inner layer 31) or attached to the inner wall of the 31 of the inner layer or falling downward by (then moved below the inner layer 31 by gravity). Water is separated from the hydrogen it is accumulated in the lower portion of the inner layer 31 shown in FIG. 5. On the other hand hydrogen flows out from the main pipe 23 of the mouthpiece 22 provided above toward the respective hydrogen cartridges 10. Accumulated water can be drained by the drain valve provided in the drain pipe 34 (not shown) to the open state.

As described above, by providing the trap tank 30, it is possible to prevent the water that has been mixed in the hydrogen from being separated from the hydrogen and filling the hydrogen cartridge 10 with the water together with the hydrogen.

<Second Form>

Figure 6:
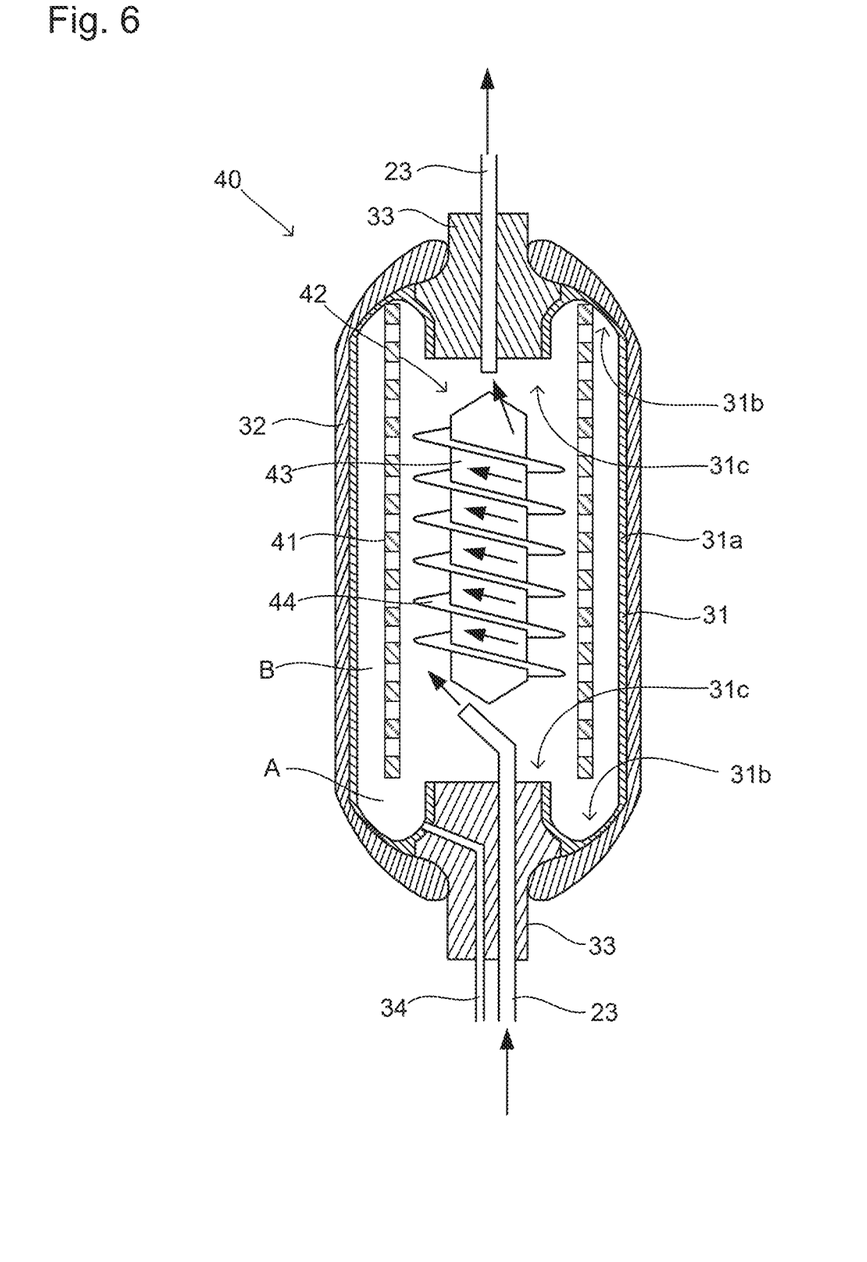
FIG. 6 is a diagram illustrating the structure of the trap tank 40.

FIG. 6 shows a cross-sectional view of the trap tank 40 of the second embodiment. As can be seen from FIG. 6, the trap tank 40 includes an inner layer 31 constituting the container portion, an outer layer 32, a mouthpiece 33 in the container portion, and a drain pipe 34 is disposed in one of the mouthpieces 33, further, a gas-liquid separation wall 41, and a spiral flow path forming member 42. Since the inner layer 31, the outer layer 32, the mouthpiece 33, and the drain pipe 34 can be considered in the same manner as in the trap tank 30 described above, the same reference numerals will be given and description thereof will be omitted.

The gas-liquid separation wall 41 is a cylindrical member disposed inside the inner layer 31, and is disposed so as to be substantially coaxial with the inner layer 31 which is cylindrical. Gas-liquid separation wall 41 is a predetermined gap B is formed between the inner surface of the outer surface and the inner layer 31 of the gas-liquid separation wall 41 with an infinite number of holes for communicating the inside and outside of the cylinder is provided on its wall surface. Therefore, the gas-liquid separation wall 41 can be constituted by, for example, punching metal or the like.

In some embodiments, the upper end of the gas-liquid separation wall 41 is brought into contact with the inner surface of the inner layer 31 and is brought into a closed state. Thus it is possible to prevent water that has reached the inner surface of the inner layer 31 is separated from flowing out from the main pipe 23 of the mouthpiece 33 above the trap tank 40 moves.

Spiral flow path forming member 42 is disposed in the cylinder of the gas-liquid separation wall 41, toward the main pipe 23 disposed in the upper mouthpiece 33 with respect to the hydrogen that has flowed into the inside of the inner layer 31 from the main pipe 23 disposed below the mouthpiece 33 in the cylinder a member for forming a spiral flow path.

Therefore, the spiral flow path forming member 42 in this embodiment has a core material 43 and a guide plate 44.

Core 43 is a cylindrical member whose axis is closed cylindrical or both bottoms are arranged substantially coaxially with the axis of the inner layer 31.

Guide plate 44 is a plate material erected from the outer periphery of the core material 43, as can be seen from FIG. 6, along the outer periphery and the axis of the core material 43, it is arranged so as to be wound helically to the core material 43. Thus, the guide plate 44 in the axial direction to form a spiral flow path having a predetermined interval (width).

According to the hydrogen filling apparatus 20 including the trap tank 40 of the present embodiment, hydrogen is filled in the hydrogen cartridge 10 as follows, for example.

In the hydrogen charging device 20 in the initial state, the solenoid valve 26 (or solenoid push rod), and the valve 27 is in the closed position. When the control device receives a signal indicating that the hydrogen cartridge 10 is mounted on the hydrogen filling device 20 from this condition and the nozzle of the hydrogen supply device is connected to the hydrogen supply unit 22 from this state, or when the control device receives a signal of the start of the hydrogen filling after the mounting, the control device opens the electromagnetic valve 26 (or the electromagnetic push rod).

Thus, hydrogen flows from the hydrogen supply unit 22, the main pipe 23, the trap tank 40, the main pipe 23, and hydrogen is filled into the hydrogen cartridge 10 through the hydrogen supply branch pipe 24.

Here, water adhering to the hydrogen supply device side or the hydrogen supply unit 22 may flow into the main pipe 23 together with hydrogen. In contrast, the trap tank 40 acts as follows.

When hydrogen from the main pipe 23 provided in the mouthpiece 33 disposed below (water is mixed) flows into the inner layer 31, hydrogen is spiraled in the axial direction of the inner layer 31 along the flow path formed in the spiral flow path forming member 42 rises so as to flow out from the main pipe 23 provided in the mouthpiece 33 disposed above. At that time, the centrifugal force acts in a direction perpendicular to the axis (the radial direction of the inner layer 31) by the spiral flow, the mass is large water is moved to the outside directly to the hole of the gas-liquid separation wall 41, or, attached to the wall of the gas-liquid separation wall 41 is finally held in the hole by moving downward along the wall of the gas-liquid separation wall 41 by gravity thereafter. The water held in the hole is similarly pushed by the hydrogen which has moved outward by centrifugal force, and escapes from the hole (gas-liquid separation wall 41) and reaches the wall of the inner layer 31, and moves downward through the gap B along the wall surface of the inner layer 31 by gravity, and accumulates in the lower portion of the inner layer 31 shown in A in FIG. 5. Accumulated water can be drained by the drain valve provided in the drain pipe 34 (not shown) to the open state.

As described above, by providing the trap tank 40, it is possible to suppress the water contained in the hydrogen from being more reliably separated from the hydrogen and the water is filled into the hydrogen cartridge 10 together with the hydrogen.

In this form, an embodiment in which the gas-liquid separation wall 41 is provided has been described, but even if the gas-liquid separation wall 41 is not provided, water moves through the inner surface of the inner layer 31 and has an effect.

REFERENCE SIGNS LIST

10 . . . 11 . . . Hydrogen cartridge (hydrogen tank), 12 . . . liner, 13 . . . reinforcement layer, 14 . . . protective layer, 15 . . . mouthpiece, 16 . . . opening/closing valve, 17 . . . case, 20 . . . hydrogen charging device, 21 . . . housing, 22 . . . hydrogen supply section, 23 . . . main piping, 24 . . . hydrogen supply branch pipe, 25 . . . connecting device, 26 . . . solenoid valve, 27 . . . valve, 28 . . . hydrogen discharge section, 30 . . . trap tank, 40 . . . trap tank

What is claimed is:

1. A hydrogen filling apparatus configured to fill a plurality of hydrogen tanks with hydrogen, the hydrogen filling apparatus comprising:
   a hydrogen supply part;
   a trap tank through which hydrogen supplied from the hydrogen supply part passes;
   a main pipe that is a pipe extending from the trap tank; and
   hydrogen supply branch pipes that are pipes extending from the main pipe to hydrogen tanks, wherein
   the trap tank comprises:
     a container part;
     an inlet through which the hydrogen flows from the hydrogen supply part into the container part; and
     an outlet that is provided above the inlet in a vertical direction, through the outlet the hydrogen flowing from the container part to the main pipe,
   wherein a flow path is provided inside the container part, the flow path spirally extending from the inlet toward the outlet, and
   wherein a porous wall is provided over outer circumferences of the spirally extending flow path.

* * * * *